(12) United States Patent
Rodriguez

(10) Patent No.: US 7,718,895 B2
(45) Date of Patent: May 18, 2010

(54) DEVICE FOR ELECTRICAL CONNECTION OF TWO SECTIONS OF A PRE-FABRICATED ELECTRICAL CANALIZATION TO PERFORM ADJUSTMENT OF SAID CANALIZATION IN LENGTH

(75) Inventor: Alejandro Rodriguez, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 294 days.

(21) Appl. No.: 11/905,684

(22) Filed: Oct. 3, 2007

(65) Prior Publication Data
US 2008/0105451 A1 May 8, 2008

(30) Foreign Application Priority Data
Nov. 7, 2006 (FR) .................................. 06 09712

(51) Int. Cl.
*H02G 3/06* (2006.01)
(52) U.S. Cl. ........................ 174/84 R; 174/86; 174/68.2
(58) Field of Classification Search ................. 174/68.2, 174/70 R, 72 R, 72 B, 99 B, 149 B, 68.1
See application file for complete search history.

(56) References Cited

U.S. PATENT DOCUMENTS

| 2,992,291 A | 7/1961 | Kussy | .................. 174/88 |
| 3,462,541 A * | 8/1969 | Wescott et al. | ............. 174/88 B |
| 5,821,464 A | 10/1998 | Graham et al. | ................. 174/86 |
| 6,435,888 B1 * | 8/2002 | Reed, Jr. | ...................... 439/213 |
| 6,486,567 B2 * | 11/2002 | Sano et al. | ..................... 307/32 |
| 6,521,837 B2 * | 2/2003 | Hilgert et al. | ............. 174/99 B |
| 6,870,103 B1 * | 3/2005 | Wiant et al. | ................. 174/68.2 |

\* cited by examiner

*Primary Examiner*—William H Mayo, III
(74) *Attorney, Agent, or Firm*—Steptoe & Johnson LLP

(57) ABSTRACT

A device for electrical connection of two sections of a pre-fabricated electrical canalization electrical canalization has a certain number of conducting bars extending substantially parallel to one another. This device includes a first set of at least one portion of bars and a second set of at least another portion of bars, where the portions of bars of the first set at least partially and respectively overlap the portions of bars of the second set, and the portions of bars of the first set of bars are in electrical contact respectively with the portions of bars of the second set over a contact zone. The two sets of portions of bars are movable with respect to one another to modify the overlap length of the portions of bars and the length of the connection device. The device includes means for securing the two sets of portions of bars in a selected adjustment position.

8 Claims, 5 Drawing Sheets

DEVICE FOR ELECTRICAL CONNECTION OF TWO SECTIONS OF A PRE-FABRICATED ELECTRICAL CANALIZATION TO PERFORM ADJUSTMENT OF SAID CANALIZATION IN LENGTH

BACKGROUND OF THE INVENTION

The present invention relates to a device for electrical connection of two sections of a pre-fabricated electrical canalization to perform adjustment of said canalization in length, said canalization comprising several conducting bars extending substantially parallel to one another.

When installation of a pre-fabricated electrical canalization is performed, a piece of canalization of non-standard and indeterminate length may be missing, which makes it necessary to use connecting elements of non-standard length to be integrated in the canalization so as to obtain the required canalization length.

The customer then has to order a special element at the end of the site work to complete the installation. This element has to be manufactured to a specific length and the customer has to wait until it is delivered to finish connecting the line.

OBJECT OF THE INVENTION

The present invention solves these problems and proposes a connection device for a pre-fabricated electrical canalization to perform adjustment of said canalization in length, that is of simple design and small dimensions, that can be installed on an already laid canalization and that enables said canalization to be adjusted to length quickly and simply on site.

For this purpose, the object of the present invention is to provide an electrical connection device of the previously mentioned kind, this device being characterized in that it comprises a first set of at least one portion of bars, and a second set of at least one portion of bars, said portions of bars of the first set at least partially overlapping respectively the portions of bars of the second set, said portions of bars of the first set of bars being in electrical contact respectively with the portions of bars of the second set of bars over a contact zone, the two sets of portions of bars being able to be moved with respect to one another in such a way as to modify the overlap length of the portions of bars and thereby the length of the connection device, and means for securing the two sets of portions of bars in the selected adjustment position.

According to a particular embodiment, the bars of one of the sets of portions of bars are secured to at least one rod and the bars of the other set of portions of bar each comprise at least one aperture designed to operate in conjunction with the above-mentioned at least one rod to enable relative movement between the portions of bars of the first and second sets of bars.

According to a particular feature, each set of bars is fitted in an enclosure whereto it is fixed, the dimensions of the enclosures being such that, when relative movement of the two sets of portions of bars takes place, one of the enclosures can slide with respect to the other enclosure by means of sliding and centring means provided partly on one of the enclosures and/or partly on the other enclosure.

According to another feature, this device comprises means for adjusting the relative position of the two enclosures, said means comprising rollers respectively comprising two spindles substantially perpendicular to one another.

According to another feature, one or both of the enclosures comprise(s) telescopic rails designed to perform guiding and centring of the bars.

According to another feature, this device comprises insulating blocks placed between two facing bars not designed to be electrically connected.

According to another feature, this device comprises at least one roller placed around the at least one rod at the level of the electrical junction between two portions of bars and designed to reduce the friction between the portions of bars and the rod.

According to another feature, this device comprises at least one clamping device for clamping the portions of movable bars and/or at least one clamping device for clamping the portions of fixed bars.

According to another feature, the contact zone between the portions of bars is constant whatever the overlap distance between the portions of bars of the above-mentioned two sets and therefore the selected adjustment position.

According to another feature, the fixed clamping device(s) of the portions of fixed bars comprise(s) insulated rods operating in conjunction with the above-mentioned apertures.

But other advantages and technical features of the invention will become more clearly apparent from the following detailed description which refers to the accompanying drawings given for example purposes only and in which:

DETAILED DESCRIPTION

Figure 1:
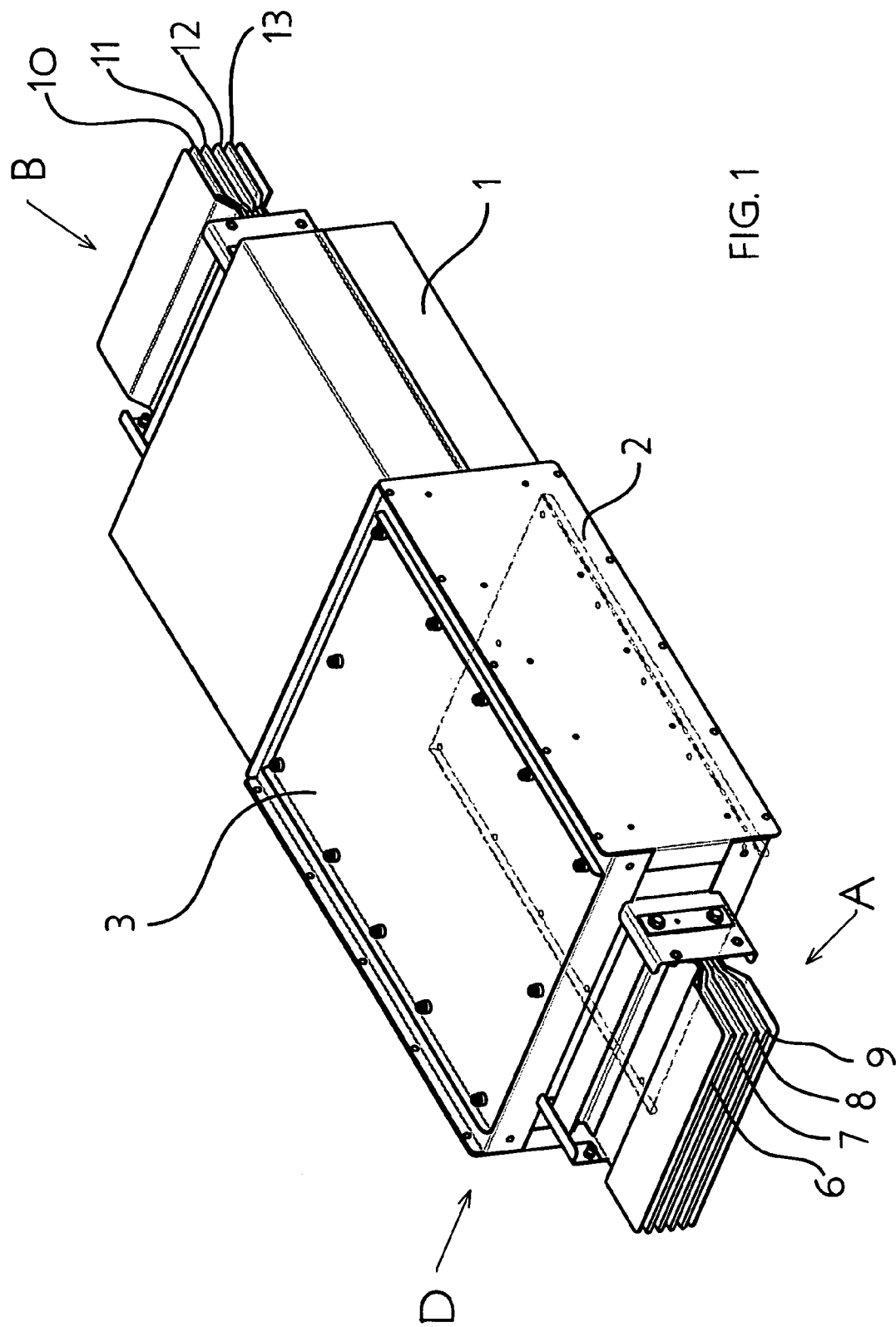
FIG. 1 is a perspective view of a connection device according to the invention.
Figure 2:
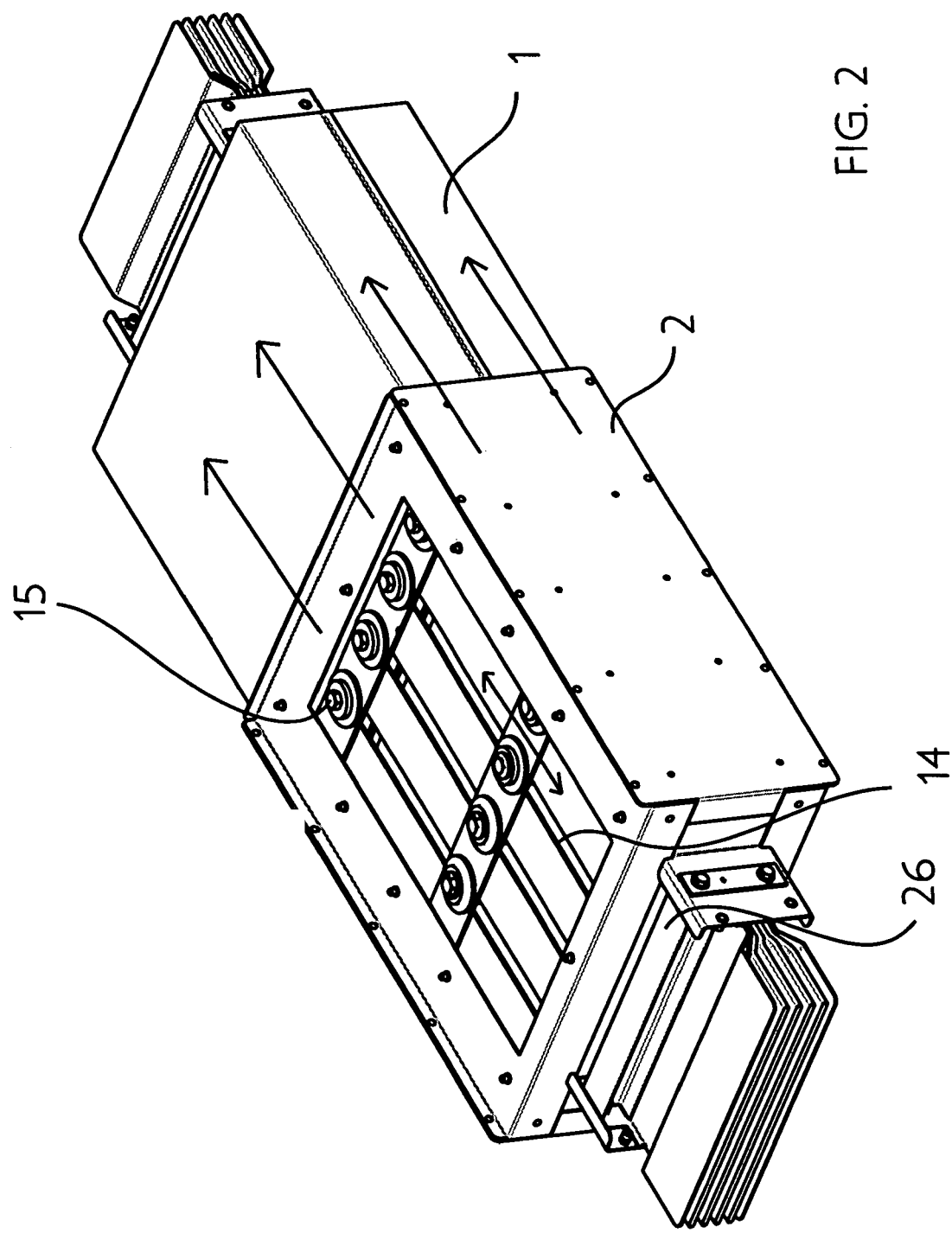
FIG. 2 is a similar view to the previous one, the access cover to the adjusting screws having been removed.
Figure 3:
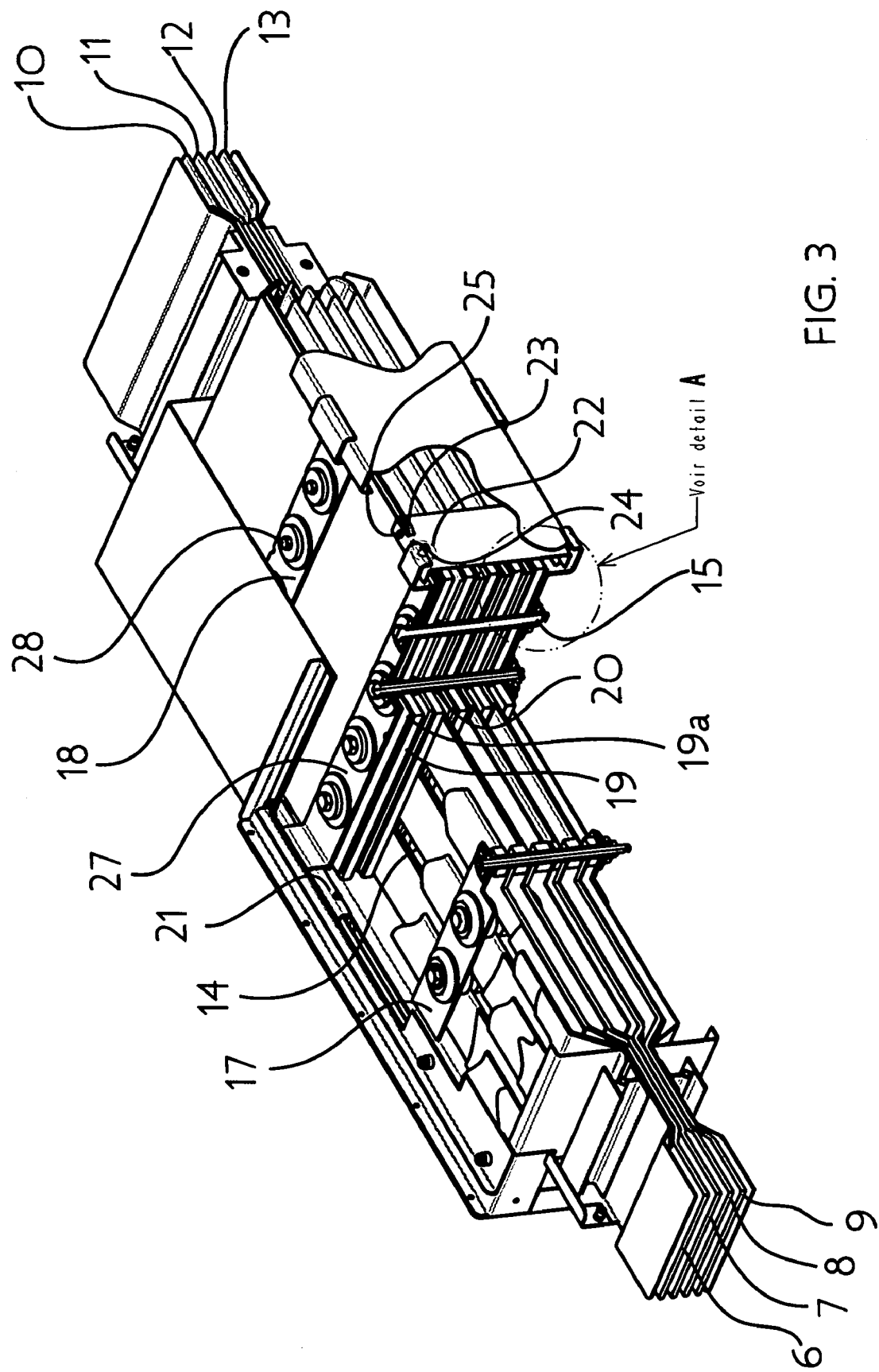
FIG. 3 is a perspective view comprising a cutaway view, illustrating the internal part of the device.
Figure 5:
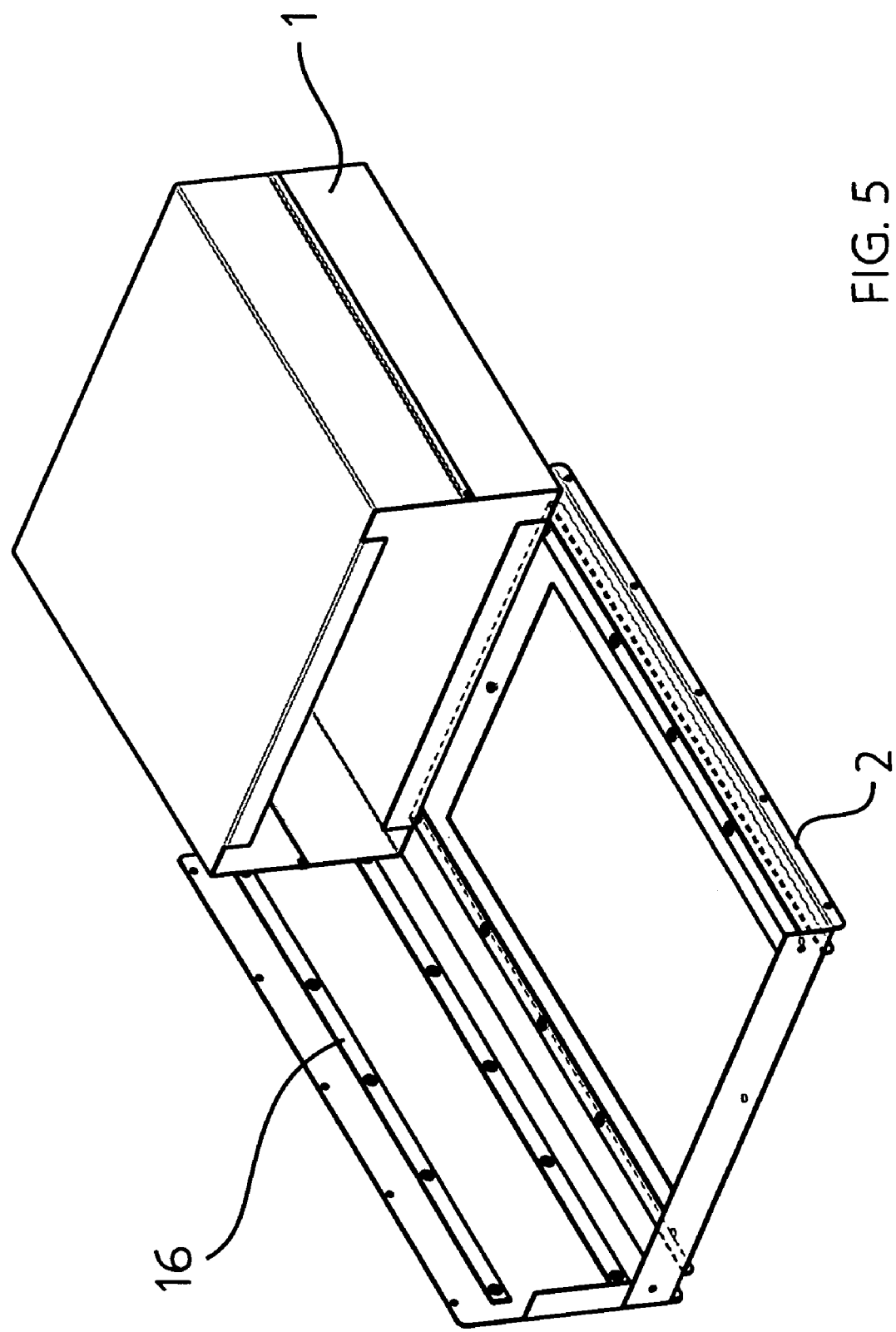
FIG. 5 is a perspective view of the two enclosures of the device according to the invention.

In FIGS. 1 to 3, a connection device D according to the invention designed to be integrated in a pre-fabricated electrical canalization to adjust the final length of the canalization can be seen. This device is housed in two enclosures 1,2 comprising a fixed part 1 and a movable part 2 that is able to move with respect to said fixed part, the movable part 2 comprising a removable cover 3 for access to adjusting screws 15 (FIG. 2). This device comprises a first set A of four portions of bars 6,7,8,9, called movable bars, housed in the movable enclosure 2, and a second set B of four portions of bars 10,11,12,13, called fixed bars, housed in the fixed part 1 of the enclosure. The portions of movable bars 6 to 9 comprise adjustment apertures 14 operating in conjunction with rods 15,28 fixed in the fixed enclosure 1 and extending perpendicularly to said bars 6 to 13 so as to perform guiding of the movable bars 6 to 9 when the latter slide with respect to the fixed bars 10 to 13 in the direction of the arrows of FIG. 2. The movable enclosure 2 presents a larger height and width than those of the fixed enclosure 1 so as to be able to slide along surfaces delineating the fixed enclosure. For this purpose, sliding and centring means 16 as illustrated in FIG. 5 are provided on the movable enclosure 2.

Referring now to FIG. 3, it can be observed that a clamping device 17 for clamping the portions of movable bars 6 to 9 is located inside the movable enclosure 2, which clamping device is designed to ensure the mechanical strength of the portions of movable bars. Likewise, there is provided inside the fixed part 1 a clamping device 18 for clamping the portions of bars called fixed bars 10 to 13 comprising rods 28, which clamping device is designed to ensure the mechanical strength of the portions of fixed bars 10 to 13, and a clamping device 27 comprising rods 15, said rods 15 and 28 performing guiding of the movable bars 6 to 9. The clamping device 27 also serves the purpose of keeping the connection device at the required length.

Figure 4:
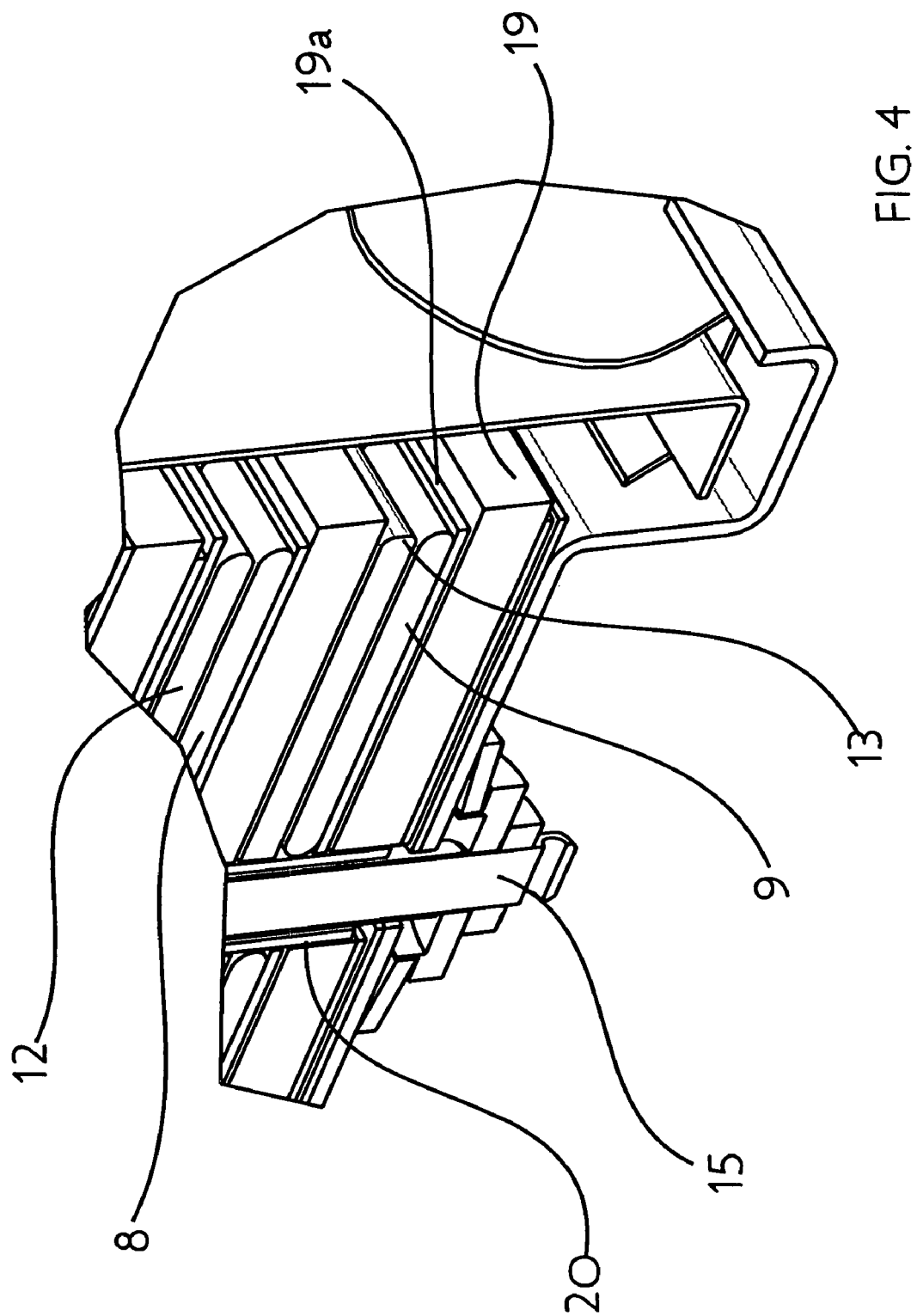
FIG. 4 is a view of a detail A of the previous figure.

As illustrated in FIGS. 3 and 4, insulating blocks 19 and insulating strips 19a are placed between the portions of bars at the level of the junction 27 between the portions of bars. The insulating strips also comprise apertures to enable the latter to be moved at the same time as the portions of movable bars 6 to 9 with respect to the portions of fixed bars 10 to 13. Rollers 20 are placed around the rods 15 at the level of the electrical junction of the portions of bars 6,7,8,9 and 10,11, 12,13 and are designed to facilitate relative sliding of the portions of bars, these portions of bars being guided in translation due to the presence of telescopic rails 21 provided on the enclosures 1 and 2 and by means of the above-mentioned apertures 14 which slide on the insulated rods 15,28 which pass through the clamping devices 27 and 18.

These fixed clamping devices 18 and 27 and the movable clamping device 17 enable the short-circuit performance to be guaranteed whatever the length of the canalization.

Handling of the movable enclosure 2 to obtain relative movement between the two enclosures is performed by means of two rollers 22,23 respectively presenting two perpendicular spindles 24,25 provided on the same side as the telescopic rail 21. The assembly is kept at the required length by the single clamping device with bolts 27 (FIG. 3). The presence of the clamping devices 26 designed to improve the mechanical strength of the bars and enabling lengthwise adjustment of the device to be performed, in the manner of handles, can be noted at the two ends of the connection device.

A connection device has therefore been achieved according to the invention enabling adjustment of the length of the canalization via apertures on the bars and telescopic enclosures.

This device enables adjustment of the length of the connection to be performed from a nominal length by the fitter on the customer's site.

The length of a straight prefabricated canalization element can therefore be adjusted on site without any loss of protection factor and short-circuit performances.

A reduction of the implementation time is obtained by the fact that special orders called end-of-site orders do not have to be placed. A flexibility of adjustment of a straight element of between 1100 and 1500 millimeters can thus be obtained. Adjustment of the element is performed without any special tools.

Naturally the invention is not limited to the embodiments described and illustrated in the above which have been given for example purposes only.

On the contrary, the invention encompasses all the technical equivalents of the means described as well as combinations thereof if the latter are performed according to the spirit of the invention.

What is claimed:

1. A device for electrical connection of two sections of a pre-fabricated electrical canalization, said electrical canalization comprising a certain number of conducting bars extending substantially parallel to one another, comprising a first set of at least one portion of said bars, and a second set of at least another portion of said bars, said portions of bars of the first set at least partially overlapping respectively the portions of bars of the second set, said portions of bars of the first set of bars being in electrical contact respectively with the portions of bars of the second set of bars over a contact zone, the two sets of portions of bars being movable with respect to one another to modify the overlap length of the portions of bars and thereby the length of the connection device, and means for securing the two sets of portions of bars in a selected adjustment position, the bars of one of the sets of portions of bars being secured to at least one rod, and the bars of the other set of portions of bars each comprising at least one aperture for operating in conjunction with said at least one rod to enable relative movement between the portions of bars of the first and second sets of bars, and a device comprising at least one roller around the at least one rod at the level of the electrical junction between two portions of bars for reducing friction between the portions of bars and the rod.

2. The device according to claim 1, wherein each set of bars is fitted in a respective one of cooperating enclosures whereto it is fixed, the dimensions of the enclosures being such that, when relative movement of the two sets of portions of bars takes place, one of the enclosures can slide with respect to the other enclosure by means of sliding and centering means provided on one or both of the enclosures.

3. The device according to claim 2, comprising means for adjusting the relative positions of the two enclosures, said means comprising two rollers respectively comprising two spindles substantially perpendicular with respect to one another.

4. The device according to claim 2, wherein at least one of the enclosures comprises telescopic rails for guiding and centering the bars.

5. The device according to claim 1, comprising insulating blocks between two adjacent bars not electrically connected to each other.

6. The device according to claim 1, comprising at least one clamping device for clamping the portions of bars of the first set and/or at least one clamping device for clamping the portions of bars of the second set.

7. The device according to claim 1, wherein the contact zone between the portions of bars is constant regardless of the overlap distance between the portions of bars of the two sets and the selected adjustment position.

8. The device according to claim 6, wherein the at least one clamping device of the portions of bars of the second set comprise insulated rods operating in conjunction with the at least one aperture.

* * * * *